ERROR ENCODING SYSTEM FOR SEQUENTIALLY INDICATING ERRORS IN TRANSFER OF DIGITAL INFORMATION

Filed Nov. 30, 1961 2 Sheets-Sheet 1

INVENTOR.
LOUIS G. OLIARI

BY Fred Jacob

ATTORNEY

INVENTOR.
LOUIS G. OLIARI
BY Fred Jacob
ATTORNEY

United States Patent Office 3,231,859

Patented Jan. 25, 1966

3,231,859
ERROR ENCODING SYSTEM FOR SEQUENTIALLY INDICATING ERRORS IN TRANSFER OF DIGITAL INFORMATION

Louis G. Oliari, Brockton, Mass., assignor to Honeywell Inc., a corporation of Delaware Filed Nov. 30, 1961, Ser. No. 155,979
13 Claims. (Cl. 340—146.1)

The present invention relates in general to a new and improved error handling apparatus for use with data transfer equipment, in particular to apparatus for handling errors which occur during the transfer of externally generated data to data storage facility of the kind used in digital computers.

Externally generated digital data for computer use, such as may be derived from a card reader, a paper tape reader, magnetic tape, etc., is frequently not transferred directly to the computer, but is written into a storage medium from where it may be called up at the command of the computer. Such procedure enhances the flexibility of the computer inasmuch as it enables it to process the stored data in accordance with its own program and at its own pace. The transfer of the externally generated data to a storage medium is at times accompanied by errors which, unless they are properly disposed of, may produce data processing errors. Such transfer errors may arise in the process of transmitting data read from the card or tape to the storage apparatus, or upon writing it into the storage medium.

The generally used corrective procedure upon the occurrence of a transfer error requires the storage medium to be backed up to the error location. The erroneous data is then erased and rewritten in correct form. Such a procedure may be extremely time-consuming, particularly in the case where the storage medium consists of magnetic tape, and may require an entire tape to be rewritten. It may require that the storage apparatus, and therefore its control equipment, have the ability to back up the storage medium to the required location. Thus, the cost of carrying out such a data transfer is high in terms of time and of equipment.

It is an object of the present invention to provide apparatus which is not subject to the foregoing disadvantages.

It is a further object of this invention to provide a system for handling errors incurred in the transfer of externally generated data to a storage medium, which is relatively simple in construction and which can rapidly dispose of such errors.

The inventon will be explained and illustrated with respect to a digital computer which receives externally derived data and stores it on magnetic tape. In a preferred embodiment of the invention the data consists of characters which are used to form data words. The words are organized into data records, each record in addition to the information words contained therein, further comprising additional words which relate to the control of the record, to its verification and to its termination respectively.

In the present invention, apparatus is provided for including in the control word of each record information relative to the presence or absence of transfer-incurred data errors. The data stored on tape may include erroneous records, suitably marked by means of the control word in a manner whereby a pair of successive records must be examined to determine the existence of errors in the first record. The occurrence of an error in a record may be further accompanied by an attempt to rewrite that record in correct form on tape. The first correct record following a record containing an error, regardless of whether or not it is a new record or whether it resulted from a correct rerun and transfer of the preceding erroneous record, is detected with reference to the record following it.

These and other novel features of the invention, together with further objects and advantages thereof, will become apparent from the following detailed specification with reference to the accompanying drawings in which.

Figure 1:
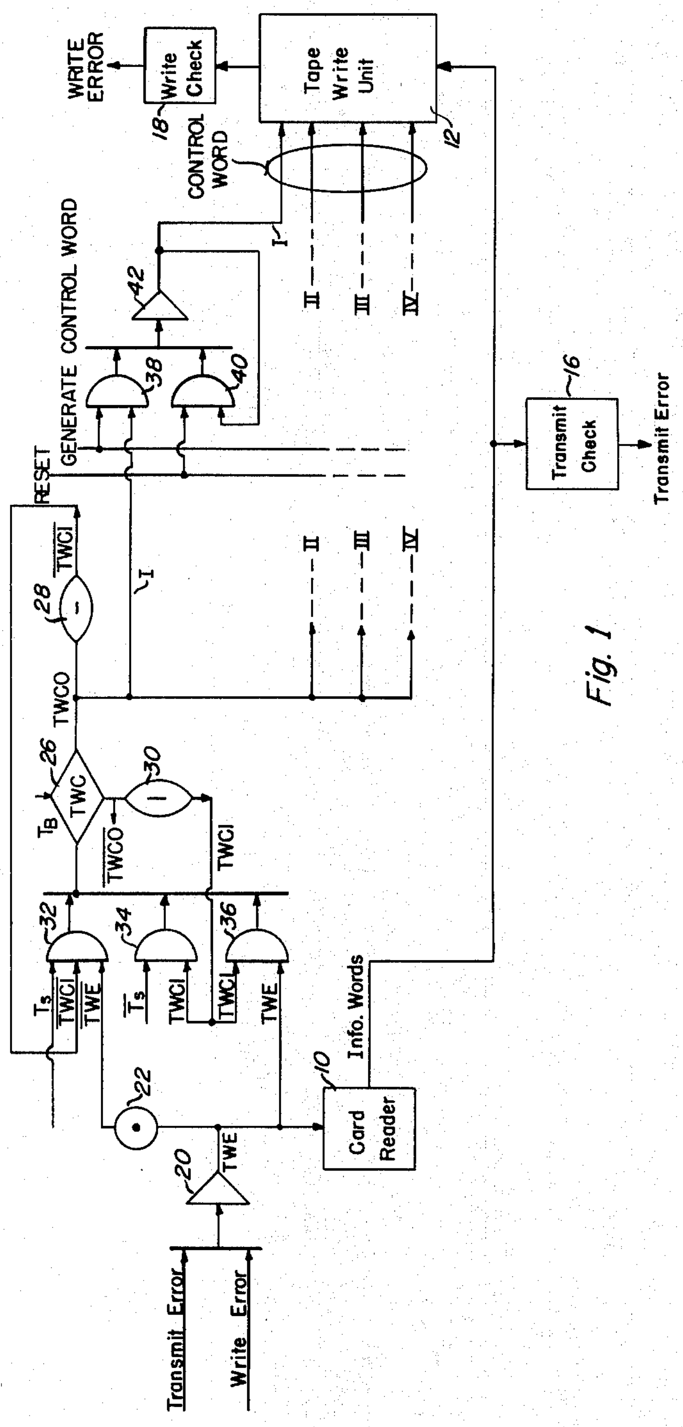
FIGURE 1 illustrates a preferred embodiment of the invention for recording error indications.

With reference now to the drawings, FIGURE 1 shows the invention with reference to a magnetic tape storage medium. As previously explained, the data is organized into records, each record comprising information words as well as a control word which contains the data governing the disposition of the record. Where the external data source consists of a card reader, as shown at 10 in FIGURE 1, each card contains a single record. As is illustrated schematically in FIGURE 1, the information words derived from the card reader 10 are transmitted to a tape write unit 12 which is adapted to store the record on magnetic tape. A data-transmit checking unit 16 is adapted to provide a transmit error signal in response to an error incurred during the data transmission. A write check unit 18 is associated with the tape write unit 12 and provides a write error signal in the event of erroneous writing of the information on the magnetic tape.

The above-described elements will be understood to take conventional forms known to those skilled in the art. For instance, U.S. Patent 3,037,193 to Barbagallo et al. shows an exemplary magnetic tape transducer (Read-write means) together with related checking means (of FIGURE 3 especially). U.S. Patent 3,037,-697 to Kahn shows the same using parity error checking means (of FIGURE 3), such as has been found suitable with the disclosed embodiment. A similar check means is shown as related to data transfer between a register means (viz. magnetic tape control register) and an input/output device (viz. card reader) in U.S. Patent 3,130,386 to Barbagallo et al. While many electronic card readers will be recognized as applicable with the invention, the type indicated in U.S. Patents 3,008,126 (November 1961) to Estrems and 2,750,113 to Coleman are suggested as exemplary.

The transmit error signal and the write error signal are buffered to the input of an amplifier 20 which is adapted to provide an assertive transfer write signal TWE upon the occurrence of a transfer error. The latter signal is further applied to an inverter 22 to provide a $\overline{TWE}$ signal in the absence of a transfer error.

A transfer write control circuit TWC comprises a bistable flip-flop circuit of the type which is capable of changing stable states only in synchronism with periodically applied timing pulses $T_B$. As shown in FIGURE 1, an assertive output signal TWC0 as well as a negative output signal $\overline{TWC0}$ are derived from the outputs of the flip-flop circuit TWC. The signal TWC0 is further applied to a delay inverter 28 to provide an output signal $\overline{TWC1}$, i.e. the delayed negation of the signal TWC0. Similarly, the signal $\overline{TWC0}$ is applied to a delay inverter 30 to provide a signal TWC1 which is the delayed negation of the signal $\overline{TWC0}$.

A gate 32 is connected to receive a timed sampling signal $T_S$ as well as the aforesaid delayed negation $\overline{TWC1}$ of the assertive output signal of the flip-flop circuit TWC. In addition, the gate 32 receives the $\overline{TWE}$ signal at its input. A gate 34 is connected to receive the negation $\overline{T_S}$ of the aforesaid timed sampling signal $T_S$ at its input together with the delayed assertion TWC1 of the output signal of the flip-flop TWC. A gate 36 is connected to receive the signals TWE as well as TWC1 at its inputs. The outputs of the gates 32, 34 and 36 are buffered to the input of the flip-flop circuit TWC. The output of the flip-flop circuit TWC is applied to four identical channels I, II, III and IV, each of which includes a gate buffer amplifier. Each gate buffer amplifier comprises a pair of gates, such as the information gate 38 and the reset gate 40 in channel I. One input leg of the gate 38 is connected to receive the signal TWC0, the other input leg being connected to receive a timing signal adapted to generate the control word for each record. The gates 38 and 40 are buffered to an amplifier 42, the output of which is applied to one input of the gate 40. The other input leg of the gate 40 is connected to receive a reset signal which is adapted to clear the contents of the gate buffer amplifier. Corresponding connections apply to the remaining channels II, III and IV. The outputs of the aforesaid channels are coupled to the tape write unit 12.

Figure 2:
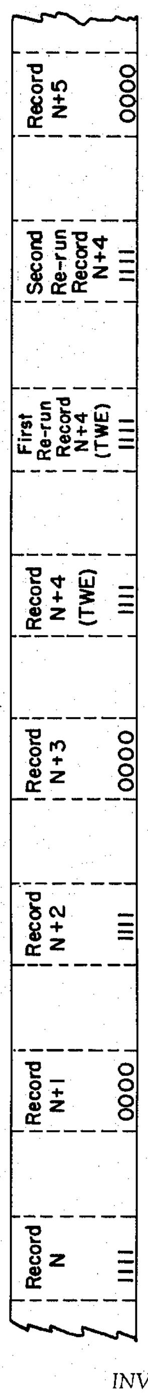
FIGURE 2 illustrates the data recorded in the storage medium in accordance with the principles of the invention.

The operation of the apparatus of FIGURE 1 will be explained with the aid of FIGURE 2 which illustrates the storage of records on magnetic tape. Let it be assumed that the particular card examined by the card reader 10 contains the record N. The information words contained in the record are read out, transmitted to the tape write unit 12 and written onto the tape, while checks are conducted by the units 16 and 18 respectively. If neither of these units detects an error, the transfer write error signal TWE which is generated at the output of the amplifier 20 will be ZERO, while the negation $\overline{TWE}$ of that signal will be ONE. Assuming that the present stable state of the flip-flop circuit TWC is ZERO, the delayed and inverted output signal $\overline{TWC1}$ will be ONE. Thus, two of the input legs of the gate 32 have binary ONE signals applied thereto. Upon the arrival of the next sampling pulse, the signal $T_S$ becomes ONE and a ONE signal will appear at the output of the gate 32 which is applied to the flip-flop circuit TWC. The arrival of the next timing pulse $T_B$ causes the flip-flop circuit TWC to switch stable states and a binary ONE appears at the output TWC0.

It will be apparent that once the gate 32 has applied a ONE pulse to the flip-flop circuit TWC to switch the latter to the ONE state, the signal $\overline{TWC1}$ will become ZERO so as to render the gate 32 nonconductive. Moreover, the sampling pulse $T_S$ is on only during a predetermined time interval sufficiently long to await the arrival of the next timing pulse $T_B$. Unless a ONE pulse is applied to the input of the flip-flop circuit TWC, the arrival of the subsequent timing pulse $T_B$ will switch the flip-flop circuit to the ZERO state. In order to maintain the flip-flop circuit in the ONE state, the signal TWC1 is applied to the gate 34 together with the signal $\overline{T_S}$. The joint application of these signals will cause the gate 34 to conduct and to apply a ONE pulse to the input of the flip-flop circuit TWC. Consequently, the gate 34 remains conductive during the occurrence of subsequent $T_B$ pulses so that the flip-flop circuit remains in the ONE state until the arrival of the next sampling pulse $T_S$ which is associated with the subsequently read out record.

The output signal TWC0 is applied to one input leg of the information gate in each of the channels I, II, III and IV respectively, e.g. the gate 38 in channel I. It will be understood that the action explained below for channel I, occurs in a similar manner in the remaining channels. Upon the arrival of a Generate Control Word timing signal, the information gate 38 becomes conductive and applies a ONE pulse to the amplifier 42 which is stored in the gate buffer amplifier by recirculation. The binary ONE signal is further applied to the tape write unit 12 where it is written into the control word that is associated with the record N. Since the action in each channel is identical, the code 1111 is associated with the record N, as shown in FIGURE 2.

After the code 1111 has been written into the control word that is associated with the record N, the gate buffer amplifiers are reset to ZERO by the application of a reset signal to the reset gate in each channel, e.g. the gate 40 in channel I, thereby interrupting the recirculation of the stored digit.

When the next card moves into reading position, the card reader 10 reads the record N+1 out, and this data is transferred to the tape write unit 12 for storage in the magnetic tape storage medium. If the transfer was carried out without error, the signal $\overline{TWE}$ will again be ONE. However, since the flip-flop circuit TWC was previously switched to the ONE state, the signal $\overline{TWC1}$ will be ZERO and the gate 32 will fail to conduct upon the arrival of the sampling pulse $T_S$. Accordingly, the flip-flop circuit TWC will switch to its ZERO state upon the arrival of the next timing pulse $T_B$ causing the signal TWC0 to become ZERO. With the flip-flop circuit TWC in the ZERO state, the signal TWC1 is similarly ZERO. Thus, when the signal $\overline{T_S}$ is applied to the gate 34 upon the expiration of the sampling pulse interval, the gate 34 remains cut off. Accordingly, the flip-flop circuit TWC, having a ZERO signal applied to its input, fails to switch stable states upon the arrival of subsequent timing pulses $T_B$.

Upon the arrival of the next Generate Control Word signal, the gate 38 fails to become conductive because TWC0 is ZERO. The binary digit thus stored in the gate buffer amplifier will be representative of a binary ZERO. The action in all channels being identical, the code 0000 is stored on the tape in association with the record N+1, as will be seen from FIGURE 2. As in the case described above, the gate buffer amplifiers are subsequently reset to ZERO by the application of a reset signal to the gate 40.

The action which takes place when the subsequent record N+2 is transferred without error from the card reader 10 to the magnetic tape is similar to that described above in connection with the record N. The flip-flop circuit TWC is switched to the ONE state by the output signal of the gate 32 and is maintained in the ONE state by the action of the gate 34. Similarly, the transfer of the record N+3 without error will switch TWC back to the ZERO state. It will be apparent from the above description, that an errorless transfer will cause the flip-flop circuit TWC alternately to switch from the ONE to the ZERO state and back to the ONE state so as to store corresponding digits on tape in each of the channels I, II, III and IV.

Let it be assumed that an error occurs during the transfer of the subsequent record N+4 from the card reader to magnetic tape. As far as the generation of the TWE signal is concerned, it is immaterial whether the error arose as a transmit error or as a write error. The action of the apparatus is such that the generation of the control word associated with the erroneous record precedes the generation of the new TWE signal. Thus, the transfer of the record N+4 is initiated with the signal $\overline{TWE}$ being ONE, so that the gate 32 becomes conductive upon the arrival of the sampling pulse $T_S$. As before, the flip-flop circuit TWC switches to the ONE state, corresponding ONEs being written onto the tape in each of the channels as shown in FIGURE 2. In the absence of a TWE signal that is ONE, the $\overline{T_S}$ signal maintains the ONE state of the flip-flop circuit TWC during the occurrence of subsequent $T_B$ pulses.

If now the signal TWE becomes ONE in response to the error which occurred during the transfer of the record N+4, it will, together with the signal TWC1, turn on the gate 36 to apply a ONE signal to the input of the flip-flop circuit TWC. Upon the arrival of the next sampling pulse $T_S$, the signal $\overline{TWE}$ will be ZERO and hence gate 32 will remain cut off. As long as the TWE signal continues to be ONE, the action of the gate 36 will prevent the flip-flop circuit from switching to the ZERO stable state upon the arrival of the next $T_B$ timing pulse.

In the preferred embodiment of the invention which is illustrated herein, the TWE signal is further employed to effect a re-run of the record which was transferred to magnetic tape with a transfer write error. This may occur automatically, as shown, or may be left to the discretion of the operator. That is, the detection of an error by check unit 16 or check unit 18 causes a Transmit Write Error signal TWE to be applied to Card Reader 10 as indicated in FIGURE 1. This error signal may cause the card reader to retransmit the last card data-image (for instance from a buffer memory portion thereof), thus effecting a re-run of the prior "card image" before a new image is called up. Such an arrangement will be evident to those skilled in the art. Thus, it will be apparent that an error signal TWE must be applied to card reader 10 to initiate a re-run, that is, a retransmission of the prior data-image to the tape write unit 12, whereupon it will again be recorded on magnetic tape and, as before, checked for parity errors at units 16 and 18. As long as error signals are applied to Card Reader 10, the re-run cycle will be continued until a "no-error" condition exists, whereupon the next card image will be called up and transmitted in the normal indicated manner. In the present example, therefore, the record N+4 will again be read out of the card reader 10 for transfer to the storage medium. Since the previously generated TWE signal is still present, the gate 36 remains conductive during the $T_S$ interval and the flip-flop circuit TWC is maintained in the ONE state. Corresponding ONE signals will appear in each of the channels I, II, III and IV to be written into the control word which is associated with the first re-run of the record N+4, as shown in FIGURE 2.

Thus, the occurrence of a transfer error in a given record causes the record which is subsequently written onto the tape to have a control word code identical to that of the erroneous record preceding it. As will be explained hereinbelow, an identity check of successive pairs of control word codes can therefore indicate records which have been written onto magnetic tape with a transfer error.

Let it be assumed that the first re-run of record N+4 is similarly accompanied by a transfer error so as to maintain the TWE signal ONE. In the example under consideration, this will precipitate a second re-run of the record N+4, owing to the application of the signal TWE to the card reader 10. Let it be further assumed that the second re-run of the record N+4 results in a transfer without error. Even though there has been an errorless transfer of data, the TWE signal which was generated during the first re-run of record N+4 will prevent the gate 32 from conducting during the following sampling pulse interval. Accordingly, the subsequent timing pulse $T_B$ will again fail to switch the flip-flop circuit TWC so as to maintain the latter in the ONE state. As shown in FIGURE 2, a corresponding ONE code is written into the control word which accompanies the second re-run of record N+4. Inasmuch as the latter control word is identical to that preceding it, it will serve as an indication that the first re-run of the record N+4 was accompanied by a transfer error.

Since the second re-run of the record N+4 was a correct one, the signal TWE now becomes ZERO and $\overline{TWE}$ becomes ONE prior to the arrival of the sampling pulse $T_S$ which corresponds to the record N+5. This action renders the gate 36 non-conductive. Since TWC1 is ONE, the gate 34 conducts in the absence of a sampling pulse $T_S$. Hence, the action of the gate 34 prevents the flip-flop circuit TWC from switching to the ZERO state upon the occurrence of the next timing pulse $T_B$. The arrival of a sampling pulse $T_S$ causes $\overline{T_S}$ to go to ZERO and cuts off the gate 34. Since $\overline{TWC1}$ is ZERO owing to the ONE state of the flip-flop circuit, the gate 32 remains cut off. Hence, upon the subsequent timing pulse $T_B$ the flip-flop circuit will switch to ZERO and a corresponding code is written into the control word associated with the record N+5, as shown in FIGURE 2. Since this code is different from that associated with the preceding record, i.e. with the second re-run of the record N+4, it is indicative of the fact that the latter was transferred correctly.

The operation described hereinabove need not include provisions for re-running a record that was transferred with an error. Depending on the requirements of the computer, the record containing the error may simply be marked and the subsequent record may be read out by the card reader. The invention described is not restricted to the use of four channels for generating a code in the control word. The number of channels used depends on the degree of verification which is desired. The larger the number of channels, the greater the certainty of absolute verification.

Figure 3:
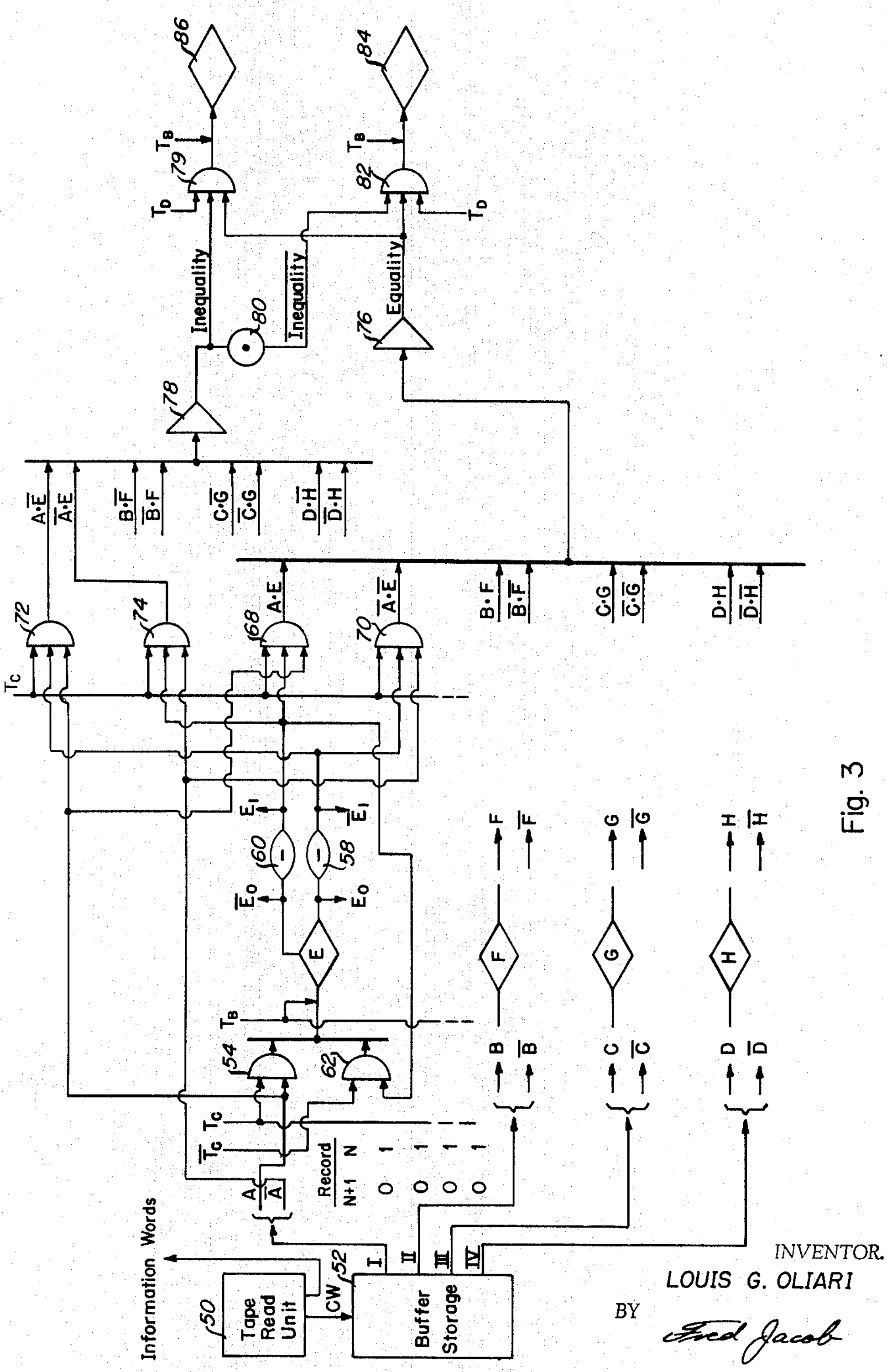
FIGURE 3 illustrates apparatus responsive to the error indications on the storage medium.

FIGURE 3 illustrates one example of apparatus for utilizing the data stored on tape by means of the apparatus of FIGURE 1. A tape read unit 50 reads out the information words contained in each record as well as the associated control word. The latter is placed into a buffer storage unit 52 from which it is subsequently read out by way of the channels I, II, III and IV for comparison with the control word code corresponding to the preceding record. The signals derived from each of these channels are labeled A, $\overline{A}$; B, $\overline{B}$; C, $\overline{C}$; and D, $\overline{D}$ respectively in FIGURE 3. As before, only channel I has been completely illustrated.

Upon the occurrence of a timed readout signal $T_C$, the control word code signal A is applied to a gate 54 whose output is in turn applied to a flip-flop circuit E. The latter provides an assertive readout signal $E_0$ which is delayed and inverted by the unit 58 to appear as $\overline{E_1}$. Similarly, an output signal $\overline{E_0}$ is derived from the flip-flop circuit E which, upon being applied to the delay inverter 60 becomes $E_1$. The flip-flop circuit 56 is similar to the flip-flop circuit TWC described in connection with FIGURE 1, and is capable of being switched only upon the occurrence of the aforesaid timing pulses $T_B$. The aforesaid signal $E_1$ is applied to one input leg of a reset gate 62, the other input leg receiving a signal $\overline{T_C}$. The outputs of the gates 54 and 62 are buffered to the input of the aforesaid flip-flop circuit E.

In channel I, a set of gates 68, 70, 72 and 74 respectively is connected so that each gate has a timing signal $T_C$ applied to one input thereof. The gates 68 and 74 are further connected to the output of the delay inverter 60 to receive the signal $E_1$. The gates 70 and 72 are connected to the output of the delay inverter 58 to receive the signal $\overline{E_1}$. The gates 68 and 72 are directly coupled to the channel I output of the buffer 52 so as to receive the signal A. The gates 70 and 74 are similarly coupled, but receive the signal $\overline{A}$. The signal, which appears at the outputs of the gates 68 and 70 are designated as $A \cdot E$ and $\overline{A} \cdot \overline{E}$ respectively and they are jointly buffered to an amplifier 76. The remaining channels II, III and IV include flip-flop circuits F, G and H respectively, the connections in each channel being substantially identical to those described with respect to channel I. The gate outputs of each of the channels are buffered to the aforesaid amplifier 76.

The outputs of the gates 72 and 74 in channel I, representing the signals $A \cdot \overline{E}$ and $\overline{A} \cdot E$, as well as the outputs of corresponding gates in the remaining channels, are jointly buffered to an amplifier 78. The output of the latter amplifier which is designated as an INEQUALITY signal is applied to an inverter 80. The output of the latter is designated as $\overline{\text{INEQUALITY}}$ and is coupled to a gate 82. The gate 82 further has a timing signal $T_D$ applied thereto together with the output of the amplifier 76 which is designated as an EQUALITY signal. The output of the gate 82 is coupled to a flip-flop circuit 84 which is similar in construction to those described hereinabove and is adapted to change stable states only upon the occurrence of the aforesaid timing signal $T_B$. The outputs of the amplifiers 76 and 78 are coupled to a gate 79 which further receives the aforesaid timing signal $T_D$. The output of the gate 79 is connected to a flip-flop circuit 86, similarly adapted to change stable states only upon the occurrence of $T_B$.

The function of the circuit of FIGURE 3 is to compare the code of the control word in each record with the code of the record preceding it in order to determine transfer errors. Each record is read out from tape by the tape read unit 50. The control word code is coupled to the buffer storage unit 52 which provides assertive and negative output signals in each of four substantially identical channels I, II, III and IV. As indicated in FIGURE 3, the first record which is read out upon the occurrence of the timed readout signal $T_C$ is the above-mentioned record N which has the code 1111 associated therewith. Referring to channel I, the A signal which is applied to the input of the flip-flop circuit E is ONE so as to switch the latter to the ONE state upon the occurrence of the next timing pulse $T_B$. Following the completion of the readout pulse $T_C$, the flip-flop circuit E is maintained in its ONE state by the action of the gate 62 which becomes active when the $\overline{T_C}$ signal becomes ONE together with the assertive delay signal $E_1$ from the flip-flop circuit E. If proper operating conditions prevail, similar switching actions occur in the flip-flop circuits F, G and H respectively.

When the subsequent record N+1 is read out by the tape read unit 50, the control word code is ZERO in all four channels. Referring again to channel I, the A signal, which is ZERO, is applied to one input leg of the gate 68. Another input leg of the aforesaid gate receives the signal $E_1$ which is representative of the ONE state of the flip-flop circuit E corresponding to the control word code of the previous record N in channel I. Accordingly the gate 68 remains cut off. The gate 70 receives the signal $\overline{A}$ which is ONE, as well as the $\overline{E}$ signal which is ZERO. The gate 70 therefore remains cut off. As a result, only ZERO signals are applied to the amplifier 76 by channel I. Assuming proper operating conditions, similar actions occur in the remaining channels. Accordingly, the output signal of the amplifier 76, which is designated as EQUALITY, will be ZERO.

If there were no possibility for errors to occur which are local to the channels themselves, an equality signal which is ZERO, as described above, could be considered to be an absolute indication that the control word code of the record N+1 is different from that of record N to show a correct record transfer. As pointed out above, the greater the number of channels employed, the better the verification of the record transfer. It will be apparent that an error may occur in a single channel which will produce EQUALITY in that channel while the remaining channels do not show such EQUALITY. While the error may be local to the particular channel, an EQUALITY signal will nevertheless appear at the output of the amplifier 76, even if the transfer of the previous record was carried out without error.

Thus it becomes necessary to carry out in addition an INEQUALITY check by means of the signals which are buffered to the input of the amplifier 78. Referring again to channel I, the gate 72 receives the signals A and $\overline{E}$ which are both ZERO. Thus, this gate will remain cut off upon the arrival of the readout signal $T_C$. The gate 74 has applied thereto the signals $\overline{A}$ and E which are both ONE. Hence, this gate will conduct when $T_C$ arrives and will apply a pulse to the amplifier 78.

Where a correct record transfer was effected, corresponding actions will occur in each channel. The resultant INEQUALITY signal derived at the output of the amplifier 78 is therefore ONE and is applied to the gate 79 which further receives an EQUALITY signal. Since the EQUALITY signal is ZERO for a correct record transfer, the gate 79 will remain cut off upon the arrival of the timing pulse $T_D$. The flip-flop circuit 86 will, depending on its previous state, either switch to ZERO upon the arrival of the subsequent $T_B$ pulse, or it will remain in the ZERO state.

The output of the amplifier 78 is connected to the inverter 80 to provide an $\overline{\text{INEQUALITY}}$ signal at the output of the latter. For a correct record transfer this signal which is applied to the gate 82, is ZERO. The gate 82 will therefore remain cut off upon the arrival of $T_D$. Accordingly the flip-flop circuit 84 will, depending on its previous state, either remain in the ZERO state upon the arrival of the subsequent $T_B$ pulse, or it will switch to the ZERO state. Thus, when both of the flip-flop circuits 84 and 86 are ZERO, the transfer of the previous record—record N in the example under consideration—was carried out without error.

If only the flip-flop 84 is in the ZERO state and the flip-flop 86 is in the ONE state, it is indicative of the fact that an EQUALITY signal as well as an INEQUALITY signal were obtained for the same record transfer. Such a situation may arise where, as outlined above, the error is local to a channel rather than due to a faulty record transfer. At the operator's option special treatment must be given to such a case.

In the case of a faulty record transfer, only the flip-flop circuit 84 will be in the ONE state since ONE signals are derived for EQUALITY and for $\overline{\text{INEQUALITY}}$. The procedure adopted may provide for discarding such a record, particularly where re-runs have been subsequently made.

From the foregoing discussion it will be apparent that the present invention provides a method of handling errors that may arise in the transfer of data from an external source to a storage medium without interfering with the operation of the medium itself. Specifically, the progress of the storage medium continues, erroneous data being suitably indicated in a manner which readily permits the detection of errors by the comparison of successive records. Where desired, the occurrence of errors may be accompanied by a re-run of a particular record under consideration so as to store a correct record in the event the cause of the error turns out to have been a temporary one upon re-running the record.

It will be apparent that the error handling scheme which forms the subject matter of the present invention permits the use of simpler circuitry than would otherwise be required. For example, in the case of a magnetic tape storage medium, the tape drive control unit need only have the ability to drive the tape in a forward direction. In addition, a faster overall data transfer results where the occurrence of a transfer error is indicated in association with each erroneous record, rather than attempting to correct the error immediately upon its occurrence. In the case of large-scale computer systems, this is a material advantage since it results in a better utilization of the system time.

It will be apparent from the foregoing disclosure of the invention that numerous modifications, changes and equivalents will now occur to those skilled in the art, all of which fall within the true spirit and scope contemplated by the invention.

What is claimed is:

1. Apparatus for handling errors incurred during the transfer of data units from an external source to a storage medium for subsequent readout from the latter, comprising a flip-flop circuit adapted to switch stable states only in synchronism with periodically occurring timing pulses, means for deriving assertive and negative error signals respectively in accordance with the transfer of each data unit, means for deriving pulses for sampling said last-recited signals during predetermined time intervals, means for gating said negative error signals and said sampling pulses to the input of said flip-flop circuit to switch the stable state of the latter upon the arrival of the next occurring one of said timing pulses, means operative only outside said predetermined time intervals for regeneratively gating the output signal of said flip-flop circuit back to its input to maintain said flip-flop circuit in its last stable state during subsequently occurring timing pulses, means for gating assertive error signals to said flip-flop circuit to maintain the latter in its last stable state upon the arrival of timing pulses during one of said predetermined time intervals, means responsive to the state of said flip-flop circuit for generating a corresponding multi-channel control signal, and means for writing said control signal on said storage medium in association with its corresponding data unit.

2. The apparatus of claim 1 and further comprising means for reading each of said multi-channel control signals out of said storage medium in association with its corresponding data unit, means for comparing successively read out control signals with each other, and means responsive to an equality determination to indicate an error.

3. The apparatus of claim 2 and further comprising means for comparing successively read out control signals, to determine an inequality, and means responsive to an equality determination concurrently with the negation of an inequality determination to indicate an error.

4. Apparatus for handling errors incurred during the transfer of data units from an external source to a storage medium for subsequent readout from the latter, comprising bistable means adapted to switch stable states only in synchronism with periodically occurring timing pulses, means for deriving assertive and negative error signals respectively in accordance with the transfer of each data unit, means operative only during predetermined time intervals for gating negative error signals to said bistable means to switch the stable state of the latter upon the arrival of the next occurring one of said timing pulses, means operative only outside said predetermined time intervals for gating signals to said bistable means adapted to maintain the latter in its last stable state during subsequently occurring timing pulses, means for gating assertive error signals to said bistable means adapted to maintain the latter in its last bistable state upon the arrival of timing pulses during one of said predetermined time intervals, means responsive to the state of said bistable means for generating a corresponding control signal, and means for transferring said control signal to said storage medium in association with its corresponding data unit.

5. Apparatus for handling errors incurred during the transfer of data units from an external source to a storage medium for subsequent readout from the latter, comprising bistable means, means for switching the stable state of said bistable means in the absence of an error upon the transfer of a data unit, means for maintaining the last stable state of said bistable means in the presence of an error upon the transfer of a data unit, means for generating a signal corresponding to the state of said bistable means, and means for storing said signal on said medium in association with its corresponding data unit.

6. The apparatus of claim 5 and further comprising means for reading said signal out of said medium in association with its corresponding data unit, and means for comparing successively read out signals to determine erroneous data units.

7. Apparatus for handling errors incurred during the transfer of data units from an external source to a storage medium for subsequent readout from the latter, comprising bistable means adapted to switch stable states only at periodic intervals, means operative upon the transfer without error of a data unit to said storage medium for applying a switching signal to said bistable means, the duration of said switching signal including the next occurring one of said periodic intervals, means operative in the absence of said switching signal for maintaining said bistable means in its last stable state, means operative upon the occurrence of a transfer error for maintaining said bistable means in its last stable state, means responsive to the state of said bistable means for generating a corresponding control signal, and means for transferring said control signal to said medium in association with its corresponding data unit.

8. Apparatus for handling errors incurred during the transfer of data units from an external source to a storage medium for subsequent readout from the latter, comprising bistable means adapted to switch stable states only in synchronism with periodically occurring timing pulses, means operative upon the transfer without error of a data unit to said storage medium for applying a switching signal to said bistable means, said switching signal occurring during an interval which overlaps the next occurring one of said timing pulses, means operative outside said interval for maintaining said bistable means in its last stable state, means operative upon the occurrence of a transfer error for maintaining said bistable means in its last stable state, means responsive to the state of said bistable means for generating a corresponding control signal, means for transferring said control signal to said medium in association with its corresponding data unit, and means responsive to the occurrence of an error during the transfer of a data unit for again transferring said last-recited data unit from said external source to said storage medium.

9. The apparatus of claim 8 and further comprising means for reading each control signal out of said storage medium in association with its corresponding data unit, means for comparing each pair of successively read out control signals, and means responsive to an equality of the compared signals for indicating the existence of an error.

10. In combination with a system for transferring data from an external source to magnetic tape for subsequent readout from said tape, said data being organized into records each comprising at least one control word in combination with a plurality of information words, apparatus for handling errors arising during said transfer comprising means for deriving assertive and negative error signals for each record, a write flip-flop circuit adapted to be switched in synchronism with a first timing signal to provide assertive and negative output signals, first gating means adapted to gate said negative error signal and said negative write flip-flop signal with a sampling signal, second gating means adapted to gate said assertive write flip-flop signal with the negation of said sampling signal, third gating means adapted to gate said assertive error signal with said assertive write flip-flop signal, the outputs of said first, second and third gating means being buffered to the input of said write flip-flop circuit, a plurality of write channels each including a gate buffer amplifier for providing a code signal, said gate buffer amplifier having information and reset gating means respectively, means for deriving reset and write timing signals respectively, said information gating means being adapted to gate said assertive write flip-flop signal with said write timing signal, said reset gating means being adapted to gate said code signal with said reset signal, and a tape write unit, the output of the gate buffer amplifier in each of said write channels being coupled to said tape write unit to store said code signal in the control word of the associated record.

11. The apparatus of claim 10 and further comprising a tape read unit adapted to provide read signals in a plurality of read channels each corresponding to one of said write channels, each of said read channels including a read flip-flop circuit adapted to provide a read signal corresponding to the code in the control word of the previously read record, and means in each channel for comparing the read signals of successive records.

12. The apparatus of claim 11 wherein each of said flip-flop circuits is adapted to provide assertive and negative signals corresponding to the previously read record, said comparing means comprising in each channel first equality gating means for gating together the assertive read signals of successive records, second equality gating means for gating together the negative read signals of successive records, and means for buffering said equality gating means of all of said channels together to derive an equality signal.

13. The apparatus of claim 12 and further comprising first inequality gating means for gating the assertive read signal of each record with the negative read signal of the preceding record, second inequality gating means for gating the negative read signal of each record with the assertive read signal of the preceding record, means for buffering said inequality gating means of all of said channels together to derive an inequality signal, means for gating together said equality and inequality signals to derive a conditional error indication, and means for gating said equality signal and the negation of said inequality signal together to derive an absolute error indication.

References Cited by the Examiner

Page 1741, October 1958, Green and San Soucie, "An Error-Correcting Encoder and Decoder of High Efficiency."

Page 969, July 1959, Hagelbarger, "Recurrent Codes: Easily Mechanized, Burst-Correcting, Binary Codes," Bell System Technical Journal.

Page 73, December 1959, Gerrand, "Compare Circuit Error Check," IBM Technical Disclosure Bulletin.

ROBERT C. BAILEY, *Primary Examiner.*

MALCOLM A. MORRISON, *Examiner.*